H. H. POFAHL.
CLEVIS.
APPLICATION FILED APR. 21, 1915.
1,187,649.
Patented June 20, 1916.
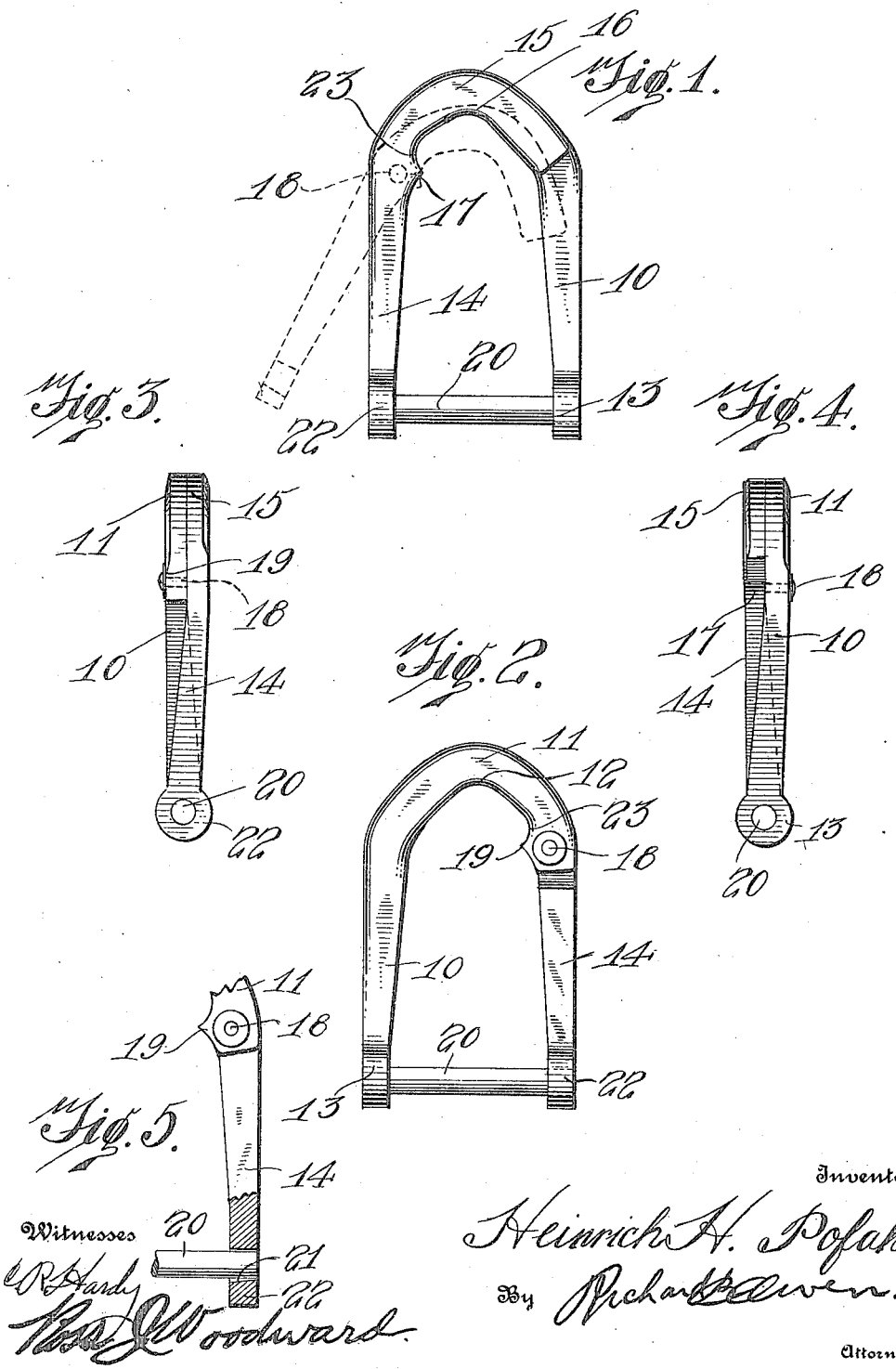

UNITED STATES PATENT OFFICE.

HEINRICH H. POFAHL, OF VIVIAN TOWNSHIP, WASECA COUNTY, MINNESOTA.

CLEVIS.

1,187,649.

Specification of Letters Patent.

Patented June 20, 1916.

Application filed April 21, 1915. Serial No. 22,922.

*To all whom it may concern:*

Be it known that I, HEINRICH H. POFAHL, a citizen of the United States, residing in Vivian township, in the county of Waseca and State of Minnesota, have invented certain new and useful Improvements in Clevises, of which the following is a specification.

This invention relates to an improved clevis and the principal object of the invention is to provide a clevis of the pivoted section type which is so constructed that pull upon the hooked end of the pivoted arm will tend to hold the same in an operative position and thus prevent any danger whatever of the clevis moving to a releasing position while in use.

Another object of the invention is to so construct the clevis that the pin carried by the stationary arm will readily pass into the tapered opening formed in the free end portion of the movable arm and thus prevent any danger of the clevis not closing properly.

Another object of the invention is to provide a clevis which will be strong and durable but at the same time very simple in construction and thus cheap to manufacture.

This invention is illustrated in the accompanying drawings, wherein:—

Figure 1 is view looking at one face of the clevis. Fig. 2 is a view looking at the opposite face of the clevis from that shown in Fig. 1. Fig. 3 is a view looking at one edge face of the clevis. Fig. 4 is a view looking at the opposite edge face of the clevis. Fig. 5 is a fragmentary view of the clevis.

The stationary arm or section 10 is provided with a hooked end portion 11 which is substantially V-shaped as clearly shown in Fig. 2 thus providing a seat 12 so that when the clevis is in use the link or other article which is placed in the clevis will be held in the desired position thus tending to hold the clevis in a closed position. It should be noted that this arm or section gradually tapers from the eye 13 to the end of the hook 11 so that when the clevis is in a closed position as shown in Figs. 3 and 4 it will be substantially the same thickness throughout its length from the two eyes to the points of the hooks. The movable arm or section 14 is also provided with a hooked end portion 15 which conforms to the shape of the hook 11 and is provided with a seat 16 similar to the seat 12. Therefore when the link mentioned before is placed within the clevis and a pressure exerted the link will be carried into the seats 12 and 16 thus holding the movable arm or section in the position shown in full lines in Fig. 1 and preventing it from moving to the position indicated by dotted lines. The arm 14 is provided adjacent the hooked end 15 with an enlargement 17 from which a pin 18 extends, the pin passing through the enlarged end 19 of the hook 11 to pivotally mount the arm 14. Therefore the arm 14 may be swung upon the end of the hook 11 to open and close the clevis. When this clevis is closed the rod or bridge 20 which is rigidly mounted in the eye 13 will pass into the tapered opening 21 formed in the eye 22 thus forming a strong and substantially rigid structure. This opening 21 is tapered so that the rod 20 may easily enter the same and also to permit the movable arm to have a tight binding action against the free end of the bridge when pressure is applied to the hook 15. It should be noted that this arm is tapered from its eye 22 to the end of its hook and that therefore the two arms will extend diagonally of each other as clearly shown in Figs. 3 and 4 when the clevis is closed.

When this clevis is in use the rod 20 can be passed through the opening or eye of a draft equalizer if the clevis is used in this connection and the eye of a swingle tree can then be passed within the clevis after the movable arm has been swung to the position shown in dotted lines in Fig. 1. The movable arm will then be returned to the position shown in full lines in this figure and upon pressure being applied the eye of the swingle tree will seat itself in the seats 12 and 16 thus holding the clevis in the closed position and preventing danger of its accidentally opening. Of course when the horses are stopped for any reason the pressure against the seats 12 and 16 would cease but the frictional binding between the rod 20 and the walls of the tapered opening 21 would prevent the movable arm from swinging to an open position. It should be further noted that when putting this clevis in place the stationary arm will be uppermost and therefore when the horses are stopped the eye of the swingle tree will not move to rest entirely upon the movable arm 14 but will rest in the pocket 23 formed by the enlargements 17 and 19. I therefore provided a clevis which will be very cheap in construction since it comprises a few number of parts which are easy to make and not liable to break or get out of order.

What is claimed is:—

A clevis comprising a stationary arm having a hooked end terminating in an enlargement forming an inwardly extending tapered finger, a bridge rod carried by said stationary arm, and a movable arm pivotally connected with the enlarged end portion of the hooked end of said stationary arm and being provided with a hooked end overlapping the hooked end of the stationary arm when in a closed position and being provided with an opening through which said bridge rod passes, said movable arm being provided at its pivot point with an enlargement forming an inwardly extending tapered finger fitting upon the enlargement of the hooked end of said stationary arm when said clevis is closed, the enlargements of said arms forming an inwardly extending abutment finger.

In testimony whereof I affix my signature in presence of two witnesses.

HEINRICH H. POFAHL.

Witnesses:
W. A. POFAHL,
J. F. VAUGHAN.

Copies of this patent may be obtained for five cents each, by addressing the "Commissioner of Patents, Washington, D. C."